(No Model.)

G. FALK.
HAND OF LEAF TOBACCO.

No. 484,930. Patented Oct. 25, 1892.

UNITED STATES PATENT OFFICE.

GUSTAV FALK, OF NEW YORK, N. Y.

HAND OF LEAF-TOBACCO.

SPECIFICATION forming part of Letters Patent No. 484,930, dated October 25, 1892.

Application filed June 21, 1892. Serial No. 437,437. (No model.)

*To all whom it may concern:*

Be it known that I, GUSTAV FALK, of the city, county, and State of New York, have invented a new and useful Improvement in Hands of Leaf-Tobacco, of which the following is a full, clear, and exact description, reference being had to the accompanying drawings, forming part thereof, and in which—

Figure 1:
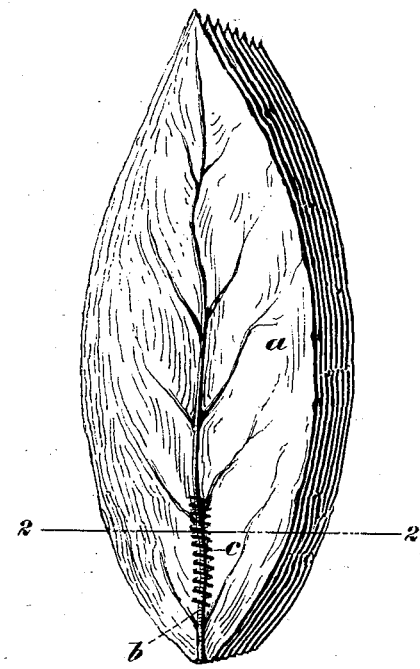
Figure 2:
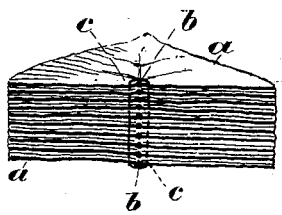

Figure 1 is a perspective view of a hand of tobacco embodying my invention. Fig. 2 is a transverse section on the line 2 2 of Fig. 1.

Like letters refer to like parts throughout the drawings.

My invention relates to an improved tobacco-hand, which is an improvement on patent granted me June 14, 1892, No. 476,943; and it consists in the construction of such hand, as hereinafter described, and distinctly pointed out in the claim.

It has been found that in following the method pointed out in my patent above referred to the transverse stitching of the leaves punctures valuable portions of the leaves and also has a tendency to break through and thus injure the body portion thereof. The object of my present invention is to obviate these difficulties by stitching longitudinally along the stem, which stem gives a support to the stitches, preventing them from tearing through and injuring the body of the leaf.

By my improved invention I am enabled to pack and ship the hands with their leaves superposed one above the other in regular order, thereby forming a flat compact mass, occupying less space and with less danger of injury than heretofore.

Fig. 1 shows a tobacco-hand embodying my invention. The butt-ends of the leaf $a$ are first removed at a point quite close to the leaf. The leaves are then placed one upon the other, so that the stem through the body portion of one leaf will be directly above the stem of the leaf below. The leaves are then stitched together longitudinally in any well-known manner, but so that the stitching will surround or partially surround the central stem $b$ of each leaf, as shown at $c$, and hold the bundle in a flat, even, and compact mass. The stitching may extend any suitable distance in a longitudinal direction.

It will be observed from the construction of my improved hand that the stitching, which partially surrounds the stem of the leaf, gets a support from such stem, which, being tough, prevents the stitching from breaking through and the consequent injury of the leaf.

Having described my invention, what I claim, and desire to secure by Letters Patent, is—

A hand of leaf-tobacco arranged together in flat form so that the stem of one leaf will be directly above the stem of the leaf below, all of said leaves secured together by longitudinal stitching, the stems of the leaves forming supports for such stitching, substantially as described.

GUSTAV FALK.

Witnesses:
HARRY M. TURK,
CHAS. E. SMITH.